(12) United States Patent
Cho et al.

(10) Patent No.: US 11,662,095 B2
(45) Date of Patent: *May 30, 2023

(54) FUEL NOZZLE AND COMBUSTOR AND GAS TURBINE INCLUDING THE SAME

(71) Applicant: DOOSAN ENERBILITY CO., LTD, Changwon-si (KR)

(72) Inventors: Moonsoo Cho, Seoul (KR); Inchan Choi, Gwangyang (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,054

(22) Filed: Oct. 15, 2021

(65) Prior Publication Data

US 2022/0034511 A1 Feb. 3, 2022

Related U.S. Application Data

(63) Continuation of application No. 16/153,626, filed on Oct. 5, 2018, now Pat. No. 11,181,270.

(30) Foreign Application Priority Data

Oct. 30, 2017 (KR) .................. 10-2017-0142545

(51) Int. Cl.
*F23R 3/12* (2006.01)
*F23R 3/28* (2006.01)
(Continued)

(52) U.S. Cl.
CPC ............... *F23R 3/286* (2013.01); *F02C 3/04* (2013.01); *F23R 3/12* (2013.01); *F23R 3/14* (2013.01);
(Continued)

(58) Field of Classification Search
CPC .................................. F23D 14/08; F02C 7/25
See application file for complete search history.

(56) References Cited

U.S. PATENT DOCUMENTS 4,587,809 A * 5/1986 Ohmori ............... B01F 25/3131
60/737
5,059,114 A * 10/1991 Stout ........................ F23K 5/18
239/113

(Continued)

FOREIGN PATENT DOCUMENTS

DE 102008044448 A1 3/2009
JP 57155009 A * 9/1982 ............. F23D 14/02

(Continued)

*Primary Examiner* — Todd E Manahan
*Assistant Examiner* — Marc J Amar
(74) *Attorney, Agent, or Firm* — Harvest IP Law LLP

(57) ABSTRACT

A fuel nozzle includes a shroud; an injection cylinder surrounded by the shroud and configured to supply fuel to a combustion chamber; a swirler disposed between the injection cylinder and the shroud; and a porous disk disposed downstream of the swirler to surround an outer peripheral surface of the injection cylinder in order to prevent a flashback phenomenon occurring due to a reduction in pressure around the swirler. The porous disk includes a disk body to block a flame produced in the combustion chamber, and a plurality of flow holes are formed in the disk body through which the fuel flows. It is possible to prevent flashback by installing the porous disk downstream of the swirler, and to impart linearity and a swirling effect to the fuel passing through the fuel nozzle by forming variously configured flow holes in the porous disk.

20 Claims, 14 Drawing Sheets

(51) Int. Cl.
*F23R 3/14* (2006.01)
*F23R 3/20* (2006.01)
*F02C 3/04* (2006.01)

(52) U.S. Cl.
CPC ............ *F23R 3/20* (2013.01); *F05D 2240/35* (2013.01); *F23D 2209/10* (2013.01)

(56) References Cited

U.S. PATENT DOCUMENTS

| | | | | |
|---|---|---|---|---|
| 5,399,085 | A * | 3/1995 | Taylor | F23N 1/027 126/91 A |
| 5,527,180 | A * | 6/1996 | Robinson | F23M 11/04 431/258 |
| 5,743,727 | A * | 4/1998 | Rodgers | F23D 14/105 431/328 |
| 6,026,645 | A * | 2/2000 | Stokes | F23R 3/286 60/737 |
| 6,179,608 | B1 | 1/2001 | Kraemer | |
| 8,234,871 | B2 | 8/2012 | Davis | |
| 11,181,270 | B2 * | 11/2021 | Cho | F23R 3/14 |
| 2003/0012651 | A1 * | 1/2003 | Arilla | F01D 5/081 416/111 |
| 2006/0021354 | A1 * | 2/2006 | Mowill | F02C 9/28 60/776 |
| 2008/0038589 | A1 | 2/2008 | Nakamura | |
| 2009/0145983 | A1 | 6/2009 | Stuttaford | |
| 2010/0064694 | A1 * | 3/2010 | Dodo | F23D 11/408 60/734 |
| 2010/0287942 | A1 * | 11/2010 | Zuo | F23R 3/346 60/737 |
| 2014/0123661 | A1 * | 5/2014 | Biagioli | F23R 3/14 60/737 |
| 2014/0238025 | A1 * | 8/2014 | Uhm | F23R 3/286 60/737 |
| 2016/0025333 | A1 * | 1/2016 | Karkow | F23D 14/84 431/328 |

FOREIGN PATENT DOCUMENTS

| | | | | |
|---|---|---|---|---|
| JP | 11248157 | A * | 9/1999 | ............ F23D 14/02 |
| JP | 2006017381 | A | 1/2006 | |
| JP | 2014122723 | A | 7/2014 | |

* cited by examiner

FUEL NOZZLE AND COMBUSTOR AND GAS TURBINE INCLUDING THE SAME

CROSS-REFERENCE TO RELATED APPLICATIONS

This is a continuation of U.S. application Ser. No. 16/153,626 filed Oct. 5, 2018 which claims priority to Korean Patent Application No. 10-2017-0142545 filed on Oct. 30, 2017, the disclosure of which is incorporated herein by reference in its entirety.

BACKGROUND OF THE INVENTION

Field of the Invention

Exemplary embodiments of the present disclosure relate to a fuel nozzle and to a combustor and gas turbine including the fuel nozzle.

Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, and the like.

This gas turbine typically includes a compressor, a combustor, and a turbine. The compressor sucks and compresses outside air, and then transmits it to the combustor. The air compressed in the compressor is in a high-pressure and high-temperature state. The combustor mixes the compressed air introduced from the compressor with fuel and burns the mixture. Combustion gas produced by the combustion is discharged to the turbine. Turbine blades in the turbine are rotated by the combustion gas, thereby generating power. The generated power is used in various fields, such as generating electric power and driving machines.

SUMMARY OF THE INVENTION

An object of the present disclosure is to provide a fuel nozzle that prevents a flashback phenomenon occurring due to a reduction in pressure around a swirler and to provide a combustor and gas turbine including the fuel nozzle.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a fuel nozzle may include a shroud; an injection cylinder surrounded by the shroud and configured to supply fuel to a combustion chamber; a swirler disposed between the injection cylinder and the shroud; and a porous disk disposed downstream of the swirler to surround an outer peripheral surface of the injection cylinder in order to prevent a flashback phenomenon occurring due to a reduction in pressure around the swirler.

The porous disk may include a disk body to block a flame produced in the combustion chamber, and a plurality of flow holes formed in the disk body through which the fuel flows.

Each flow hole may be configured as a straight through-hole aligned with a flow direction of the fuel, or as a diagonal through-hole forming a predetermined angle with a flow direction of the fuel. Each flow hole may include a curve having at least one turn. The plurality of flow holes may have different diameters which may increase from an inner peripheral surface of the disk body toward an outer peripheral surface of the disk body.

The disk body may have an outer peripheral surface that is spaced apart from an inner peripheral surface of the shroud by a predetermined distance which may be adjusted according to a magnitude of pressure reduction around the swirler.

The porous disk may consist of at least two porous disks, and each of the at least two porous disks may extend from the outer peripheral surface of the injection cylinder to an inner peripheral surface of the shroud. Further, the at least two porous disks may be arranged such that a flow direction of each of the flow holes of one of the at least two porous disks aligns with a flow direction of each of the flow holes of the other porous disks of the at least two porous disks; or arranged such that a flow direction of each of the flow holes of one of the at least two porous disks is inclined in a first direction, and a flow direction of each of the flow holes of an adjacent porous disk of the at least two porous disks may be inclined in a second direction opposing the first direction.

The porous disk may consist of at least two porous disks, and the at least two porous disks may include a first porous disk facing the combustion chamber that extends from the outer peripheral surface of the injection cylinder to an inner peripheral surface of the shroud; and at least one second porous disk spaced apart from the inner peripheral surface of the shroud by a predetermined distance. The first porous disk and the at least one second porous disk may have respective diameters that incrementally increase toward the combustion chamber.

In accordance with another aspect of the present disclosure, a combustor may include a combustion chamber assembly comprising a combustion chamber in which fuel is burnt; and a fuel nozzle assembly including a plurality of fuel nozzles to inject the fuel into the combustion chamber, wherein each of the fuel nozzles of the fuel nozzle assembly is consistent with the above-described fuel nozzle.

In accordance with a further aspect of the present disclosure, a gas turbine may include a compressor to compress air; a combustor to produce combustion gas by mixing the compressed air with fuel for combustion; and a turbine to generate power using the combustion gas, wherein the combustor of the turbine is consistent with the above-described combustor.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
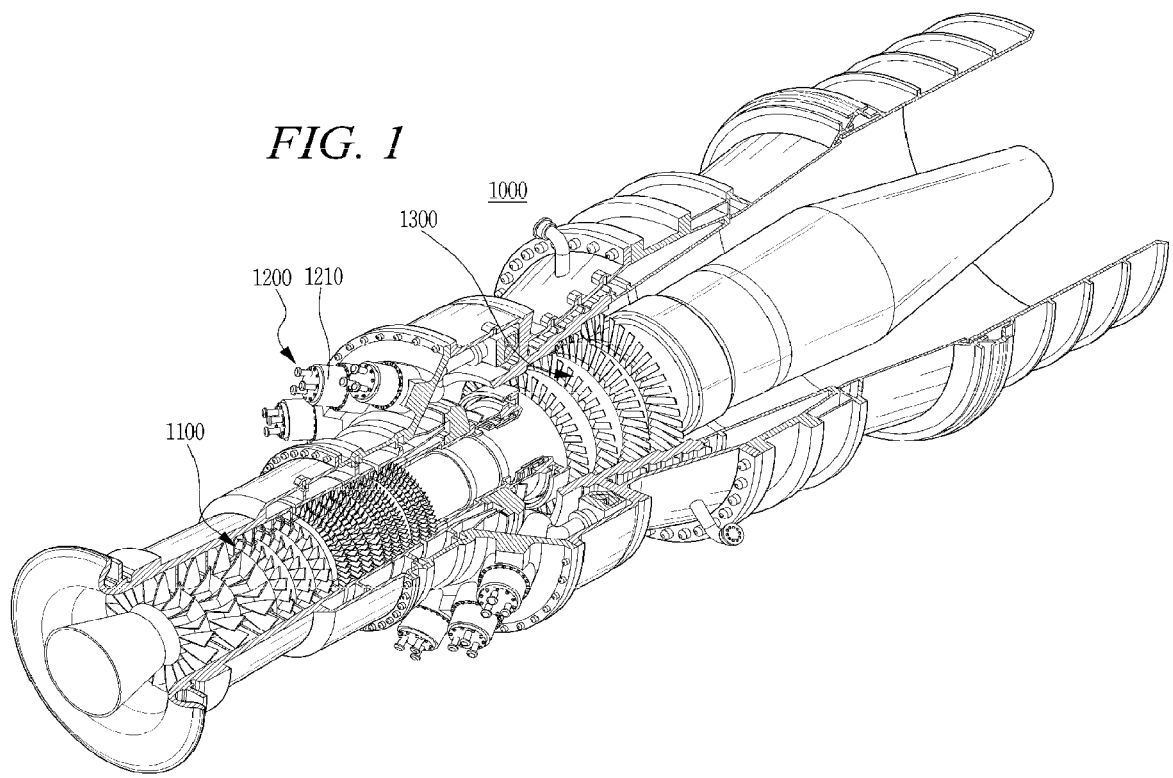
FIG. 1 is a cutaway perspective view of a gas turbine to which may be applied a fuel nozzle according to the present disclosure.

A fuel nozzle and a combustor and gas turbine including the same according to exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

It will be understood that when a component is referred to as "comprising or including" any component, it does not exclude other components, but can further comprise or include the other components unless otherwise specified. In addition, it will be understood that a spatially-relative term "on" used herein does not necessarily mean that an element is located on another element in the direction of gravity, but it means that the element is located on or under another element.

Figure 2:
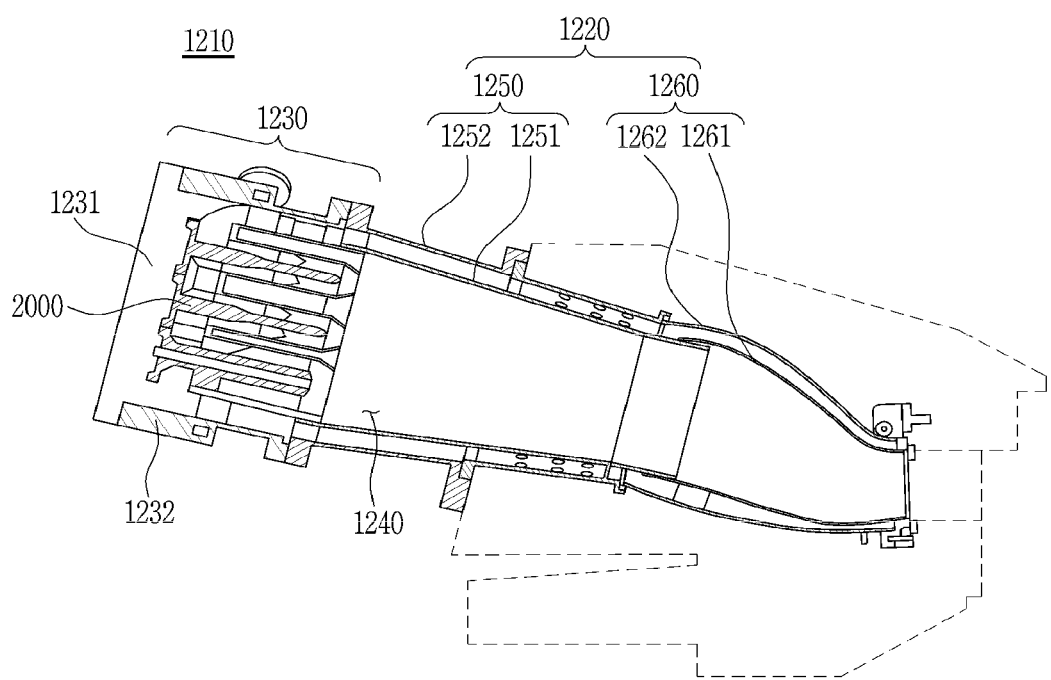
FIG. 2 is a sectional view of a combustor to which may be applied a fuel nozzle according to the present disclosure.
Figure 3:
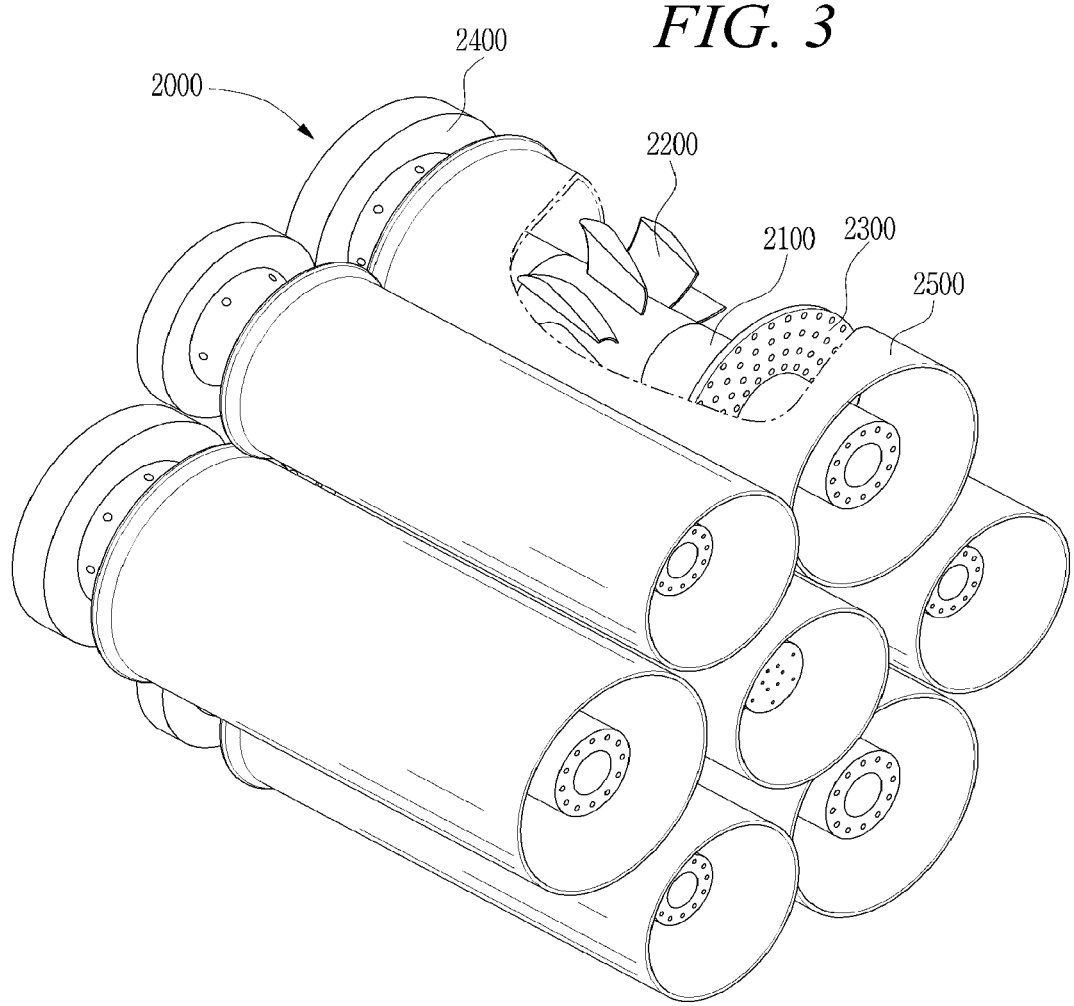
FIG. 3 is a perspective view of a fuel nozzle module including a plurality of fuel nozzles according to the present disclosure.

FIG. 1 illustrates the interior of a gas turbine 1000 including a combustor 1200 to which may be applied a fuel nozzle according to the present disclosure, and FIG. 2 illustrates an example of the combustor 1200 of FIG. 1. FIG. 3 illustrates a fuel nozzle module including a plurality of fuel nozzles according to the present disclosure, one fuel nozzle of which is detailed in FIG. 4.

Referring to FIG. 1, the gas turbine 1000 may include a compressor 1100 that compresses introduced air to a high pressure, a combustor 1200 that mixes the compressed air supplied from the compressor 1100 with fuel and burns the mixture, and a turbine 1300 that generates a rotational force by combustion gas produced in the combustor. In the present specification, upstream and downstream sides are defined based on the flow direction of fuel or air.

The thermodynamic cycle of the gas turbine may ideally follow a Brayton cycle. The Brayton cycle consists of four phases including isentropic compression (adiabatic compression), isobaric heat addition, isentropic expansion (adiabatic expansion), and isobaric heat dissipation. In other words, in the Brayton cycle, thermal energy is released by combustion of fuel in an isobaric environment after the atmospheric air is sucked and compressed to a high pressure, hot combustion gas is expanded to be converted into kinetic energy, and exhaust gas with residual energy is then discharged to the atmosphere. The Brayton cycle consists of four processes, i.e., compression, heating, expansion, and exhaust. The present disclosure may be widely applied to a gas turbine having the same or similar configuration as the gas turbine 1000 exemplarily illustrated in FIG. 1.

The compressor 1100 of the gas turbine serves to suck and compress air, and mainly serves to supply cooling air to a high-temperature region required for cooling in the gas turbine while supplying combustion air to the combustor 1200. Since the air sucked into the compressor 1100 is subject to an adiabatic compression process, the pressure and temperature of the air passing through the compressor 1100 increase.

The compressor 1100 of the gas turbine may be typically designed as a centrifugal compressor or an axial compressor. In general, the centrifugal compressor is applied to a small gas turbine, whereas a multistage axial compressor is applied to the large gas turbine 1000 as illustrated in FIG. 1 because it is necessary to compress a large amount of air.

The compressor 1100 is driven using a portion of the power output from the turbine 1300. To this end, the rotary shaft (not shown) of the compressor 1100 is directly connected to the rotary shaft of the turbine 1300.

The combustor 1200 mixes the compressed air, which is supplied from the outlet of the compressor 1100, with fuel for isobaric combustion to produce high-energy combustion gas. The combustor 1200 is disposed downstream of the compressor 1100 and includes a plurality of burner modules 1210 annularly arranged around the gas turbine 1000.

Referring to FIG. 2, each of the burner modules 1210 of FIG. 1 may include a combustion chamber assembly 1220 including a combustion chamber 1240 in which fuel is burnt, and a fuel nozzle assembly 1230 including a plurality of fuel nozzles that inject fuel to the combustion chamber 1240.

The gas turbine may use gas fuel, liquid fuel, or a composite fuel of gas and liquid, and the fuel in the present disclosure includes any of these. It is important to make a combustion environment for reducing an amount of emissions such as carbon monoxide or nitrogen oxide that is subject to legal regulations. Accordingly, in spite of the relative difficulty to control such combustion, pre-mixed combustion has been increasingly used in recent years since it can achieve uniform combustion to reduce emissions by lowering a combustion temperature.

In the pre-mixed combustion, the compressed air supplied from the compressor 1100 is mixed with fuel in the fuel nozzle assembly 1230 and then introduced into the combustion chamber 1240. When combustion is stable after pre-mixed gas is initially ignited by an igniter, the combustion is maintained by the supply of fuel and air.

The fuel nozzle assembly 1230 includes a plurality of fuel nozzles 2000 that inject fuel, and the fuel supplied from the fuel nozzles 2000 is mixed with air at an appropriate rate to be suitable for combustion. The fuel nozzles 2000 (to be described later) may be configured such that a plurality of outer fuel nozzles are radially arranged around one inner fuel nozzle, as illustrated in FIG. 3.

Referring further to FIG. 2, the combustion chamber assembly 1220 includes the combustion chamber 1240 as a space in which combustion is performed, and includes a liner 1250 and a transition piece 1260.

The liner 1250 is disposed downstream of the fuel nozzle assembly 1230, and may have a double structure formed by an inner liner 1251 and an outer liner 1252 surrounding the inner liner 1251. Here, the inner liner 1251 is a hollow tubular member forming the combustion chamber 1240. The inner liner 1251 may be cooled by the compressed air permeating an annular space inside the outer liner 1252.

The transition piece 1260 is disposed downstream of the liner 1250, and the combustion gas produced in the combustion chamber 1240 may be discharged from the transition piece 1260 to the turbine 1300. The transition piece 1260 may have a double structure formed by an inner transition piece 1261 and an outer transition piece 1262 surrounding the inner transition piece 1261. The inner transition piece 1261 is a hollow tubular member similar to the inner liner 1251 and may have a diameter that is gradually reduced from the liner 1250 to the turbine 1300. In this case, the inner liner 1251 may be coupled to the inner transition piece 1261 by a plate spring seal (not shown). Since the ends of the inner liner 1251 and the inner transition piece 1261 are fixed to the combustor 1200 and the turbine 1300, respectively, the plate spring seal must have a structure that is capable of accommodating length and diameter elongation by thermal expansion to support the inner liner 1251 and the inner transition piece 1261.

The combustor 1200 has a structure in which the outer liner 1252 and the outer transition piece 1262 respectively surround the inner liner 1251 and the inner transition piece 1261. Compressed air may permeate the annular space between the inner liner 1251 and the outer liner 1252 and the annular space between the inner transition piece 1261 and the outer transition piece 1262. The inner liner 1251 and the inner transition piece 1261 may be cooled by the compressed air permeating these annular spaces.

The high-temperature and high-pressure combustion gas produced in the combustor 1200 is supplied to the turbine 1300 through the liner 1250 and the transition piece 1260. In the turbine 1300, the thermal energy of combustion gas is converted into mechanical energy to rotate a rotary shaft by applying impingement and reaction force to a plurality of blades radially arranged on the rotary shaft of the turbine 1300 through the adiabatic expansion of the combustion gas. Some of the mechanical energy obtained from the turbine 1300 is supplied as energy required for compression of air in the compressor, and the remainder is used as effective energy required for driving a generator to produce electric power or the like.

Hereinafter, a fuel nozzle 2000 according to the embodiment of the present disclosure will be described with reference to the accompanying drawings.

Referring to FIG. 3, a fuel nozzle module includes a plurality of fuel nozzles 2000 according to the embodiment of the present disclosure, each of which includes an injection cylinder 2100, swirlers 2200, a porous disk 2300, and a shroud 2500.

The injection cylinder 2100 is a means for supplying fuel and premixing fuel and air, and extends in one direction. The injection cylinder 2100 typically has a cylindrical shape, but the present disclosure is not limited thereto. The embodiment of the present disclosure is exemplified by a cylindrical injection cylinder 2100.

Figure 4:
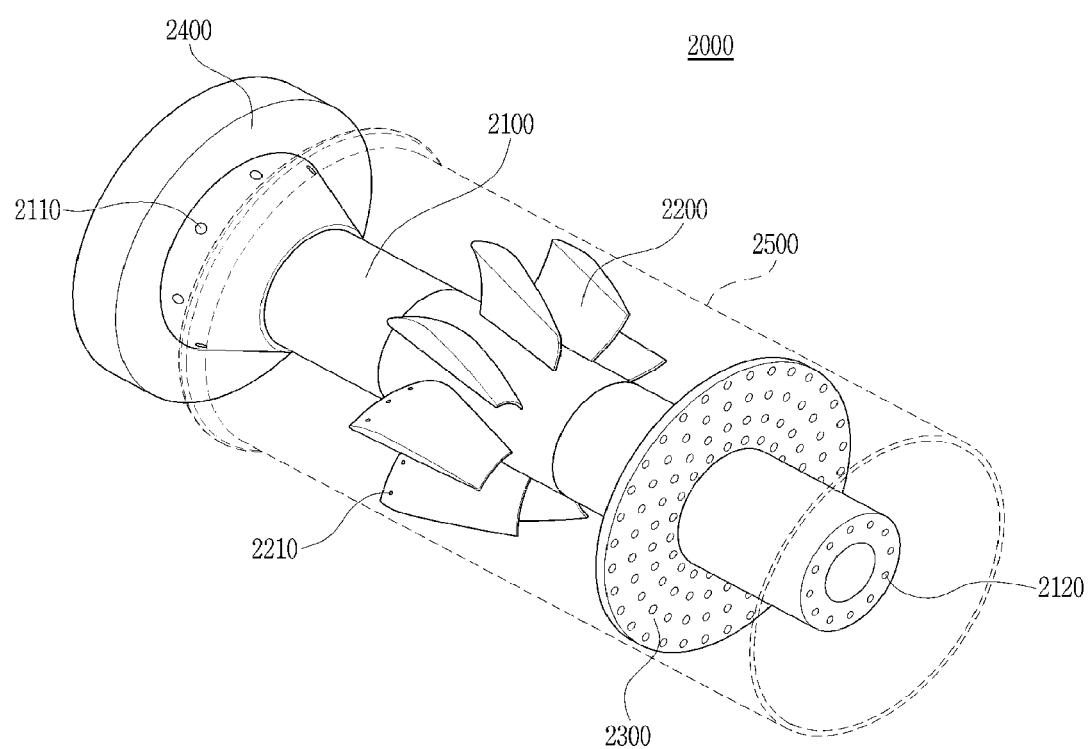
FIG. 4 is a partially transparent, perspective view of a fuel nozzle according to an embodiment of the present disclosure.

Referring to FIG. 4, the injection cylinder 2100 defines a space for mixing fuel and air, and the fuel and the air may be mixed with each other while longitudinally passing through the injection cylinder 2100. The injection cylinder 2100 may have an air introduction port 2110 through which air is introduced into the injection cylinder 2100 and a discharge port 2120 through which a mixture of air and fuel is discharged. The discharge port 2120 is formed at a downstream end of the injection cylinder 2100, and the embodiment of the present disclosure is exemplified by a discharge port 2120 formed on the bottom of the cylindrical injection cylinder 2100.

Referring again to FIG. 2, a head end plate 1231 is coupled to the end of a nozzle casing 1232 forming the outer wall of the fuel nozzle assembly 1230 to seal the nozzle casing 1232, and may be coupled with a manifold, a related valve, or the like for supplying fuel to the injection cylinder 2100. The head end plate 1231 supports the fuel nozzle 2000 disposed in the nozzle casing 1232. The fuel nozzle 2000 is fixed to the head end plate 1231 through a nozzle flange 2400 (FIG. 3) disposed at one end of the injection cylinder 2100.

Fuel is introduced through a fuel injector (not shown) and the head end plate 1231, and longitudinally flows along the injection cylinder 2100 of the fuel nozzle 2000 to be injected into the combustion chamber 1240.

The shroud 2500 surrounds the injection cylinder 2100 and extends in the same longitudinal direction as the injection cylinder 2100. In particular, the shroud 2500 is spaced apart from an outer peripheral surface of the injection cylinder 2100 to form a channel for passing fuel and air. Since the shroud 2500 is arranged on the same axis as the injection cylinder 2100 and is spaced at a certain distance from the injection cylinder 2100 so as to surround the injection cylinder 2100, the embodiment of the present disclosure is exemplified by a cylindrical shroud 2500. In this case, the channel formed by the injection cylinder 2100 and the shroud 2500 may have an annular cross-section.

The swirlers 2200 are radially arranged on the outer peripheral surface of the injection cylinder 2100, to be disposed approximately in the cylinder's longitudinal middle, thereby generating a swirl flow of fuel introduced into the space between the shroud 2500 and the injection cylinder 2100. The swirlers 2200 may each have an internal passage communicating with the internal space of the injection cylinder 2100. The fuel introduced into the injection cylinder 2100 may be discharged via the communication passages in the swirlers through outlets 2210 penetrating the inside and outside of the swirlers 2200.

Figure 5:
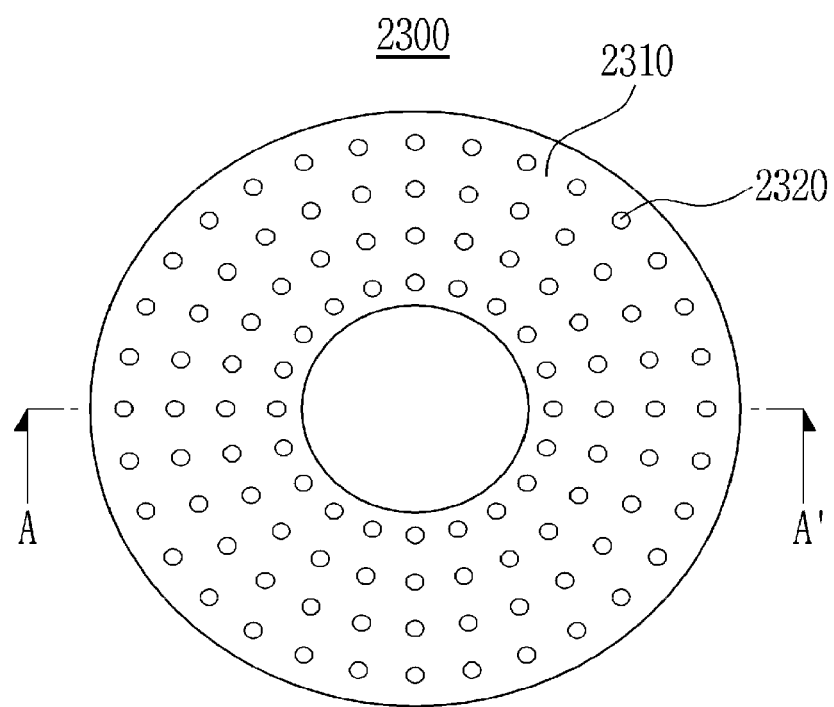
FIG. 5 is a top view of a porous disk in the fuel nozzle according to the embodiment of the present disclosure.

FIG. 4 illustrates the fuel nozzle according to an embodiment of the present disclosure, and FIG. 5 illustrates a porous disk in the fuel nozzle of FIG. 4. FIGS. 6 to 10 illustrate various modified examples of the porous disk.

In a conventional fuel nozzle, a swirl flow is generated while fuel passes through swirlers, and a pressure is reduced around the swirlers by the swirl flow. This reduced pressure causes a flashback phenomenon in which the flame produced in a combustion chamber flows backward toward the fuel nozzle. This flashback phenomenon leads to the deterioration of the fuel nozzle.

The fuel nozzle 2000 according to the embodiment of the present disclosure includes the porous disk 2300 installed downstream of the swirlers 2200 to prevent a flashback phenomenon occurring due to a reduction in pressure around the swirlers 2200.

The porous disk 2300 includes a disk body 2310 prevents the backflow of the flame produced in the combustion chamber 1240 into the fuel nozzle. The disk body 2310 is formed as a flat, disk shape having inner and outer peripheral surfaces and includes two opposing surfaces each of which is perpendicular to the flow direction of fuel through the channel between the shroud 2500 and the injection cylinder 2100. The porous disk 2300 may have a plurality of flow holes 2320 each having a predetermined size (diameter) and a predetermined shape (configuration) so as not to interrupt the flow of fuel.

The porous disk 2300 may be formed from the outer peripheral surface of the injection cylinder 2100 to the inner peripheral surface of the shroud 2500. The porous disk 2300 may be formed to abut the inner peripheral surface of the shroud 2500, but the present disclosure is not limited thereto. For example, the porous disk 2300 may be spaced at a predetermined distance from the inner peripheral surface of the shroud 2500. This distance may be adjusted according to the magnitude of pressure reduction around the swirlers 2200. That is, since there is a high possibility of flashback in the case of greater magnitudes of pressure reduction around the swirlers 2200, the distance between the porous disk 2300 and the inner peripheral surface of the shroud 2500 may be decreased, and conversely, the distance may be increased for lesser magnitudes.

Figure 6:
FIGS. 6 to 9 are cross-sectional views taken along line A-A' of FIG. 5, respectively illustrating modified examples of the porous disk of the present disclosure.

The flow holes 2320 may be radially and evenly arranged as illustrated in FIG. 5. The plurality of flow holes 2320 may extend in a pattern throughout the surface of the porous disk 2300, that is, from the outer peripheral surface of the injection cylinder 2100 to the inner peripheral surface of the shroud 2500. Each of flow holes 2320a may be configured as a straight through-hole that is perpendicular with respect to the flat surfaces of the disk body 2310 and thus aligned with the flow direction of fuel, as illustrated in FIG. 6. The formation of each of the flow holes 2320a as a straight through-hole imparts linearity to the flow of fuel introduced into the space between the shroud 2500 and the injection cylinder 2100 and thus enables a smooth flow of fuel.

Figure 7:
Figure 8:

Alternatively, as illustrated in FIG. 7, each of flow holes 2320b may be configured as a diagonal through-hole that is inclined with respect to the flat surfaces of the disk body 2310 and thus forms a predetermined angle with the flow direction of fuel. The formation of each of the flow holes 2320h as a diagonal through-hole imparts a spiral swirling effect to the fuel introduced into the space between the shroud 2500 and the injection cylinder 2100 thus enables a smooth mixing of fuel. The predetermined angle of one through-hole of the flow holes 2320b may be different from the predetermined angle of another through-hole of the flow holes 2320b, and the flow holes 2320 may include an arrangement of both diagonal through-holes and straight through-holes. The predetermined angle of one through-hole of the flow holes 2320b may be different from the predetermined angle of another through-hole of the flow holes 2320b. The predetermined angle of the through-holes of the flow holes 2320b may be consistent throughout the disk body 2310 as in FIG. 7, or the predetermined angle of one through-hole or group of through-holes of the flow holes 2320b may be different from the predetermined angle of another through-hole or group of through-holes of the flow holes 2320b. For example, as in the disk body 2310 of FIG. 8, each of flow holes 2320c may be formed such that the imaginary extension lines of one group of through-holes of the flow holes 2320c intersect with the imaginary extension lines of another group. Also, the flow holes 2320 may include an arrangement of both diagonal through-holes (FIG. 7) and straight through-holes (FIG. 6).

Figure 9:

Alternatively, as illustrated in FIG. 9, each of flow holes 2320d may include a curve having at least one turn t. In this case, the overall directionality of the flow holes 2320d including the curve may be consistent with the configuration of any of FIGS. 6 to 8. That is, the relative position of the upstream and downstream sides of the flow holes 2320d may be aligned with each other, similar to the perpendicular configuration of the flow holes 2320h; or their relative positions may be offset from each other, similar to the inclined configuration of the flow holes 2320b or 2320c.

When the flow holes 2320d are configured as a curved through-hole having at least one turn t, the direction of the fuel introduced into the flow hole 2320d (upstream side) is switched to flow in a countering direction after the turn t. Thus, it is possible to smoothly mix fuel by imparting a spiral swirling effect to the fuel.

Figure 10:
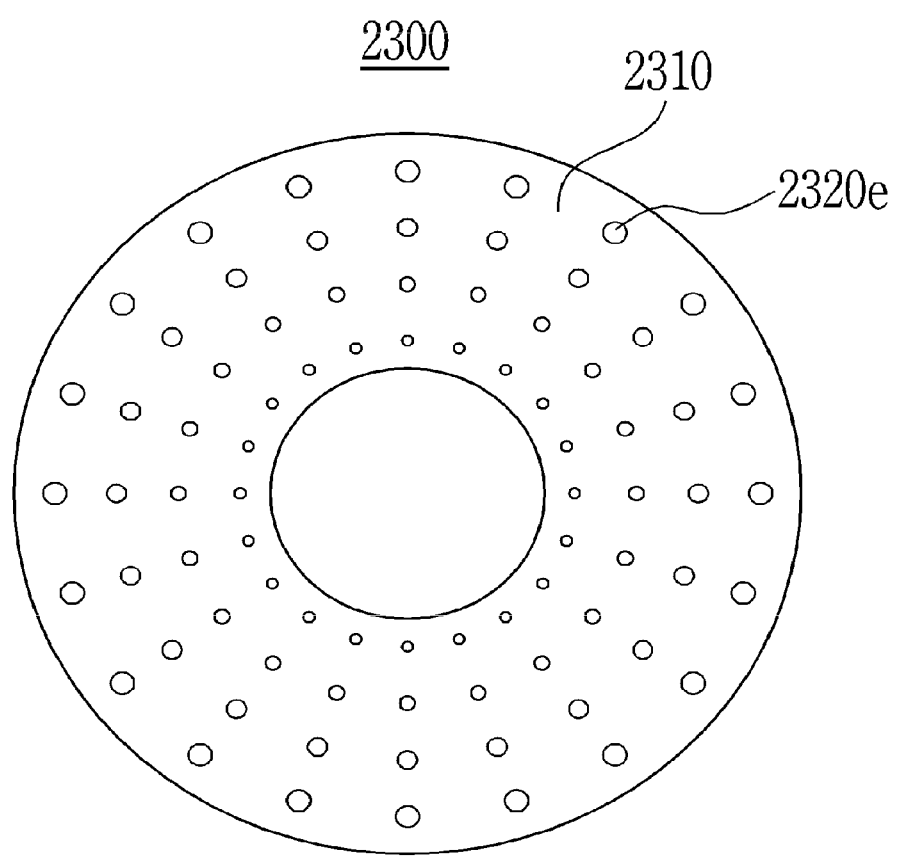
FIG. 10 is a top view of a porous disk in the fuel nozzle, illustrating another example of the porous disk of the present disclosure.

In addition, the flow holes 2320 of FIG. 5, configured as the flow holes of any of FIGS. 6 to 9, may have different diameters. For example, as illustrated in FIG. 10, a plurality of flow holes 2320e may be rendered by having diameters that increase from the inner peripheral surface of the disk body 2310 toward the outer peripheral surface of the disk body 2310. Through such a structure, the flow of fuel may be guided to increase toward the outer peripheral surface of the porous disk 2300.

Although the flow holes 2320 are illustrated as being radially arranged in FIGS. 5 to 10 for convenience of description, they may instead be arranged in a rectilinear or arbitrary direction, or be disposed at arbitrary positions according to an amorphous pattern.

Figure 11:
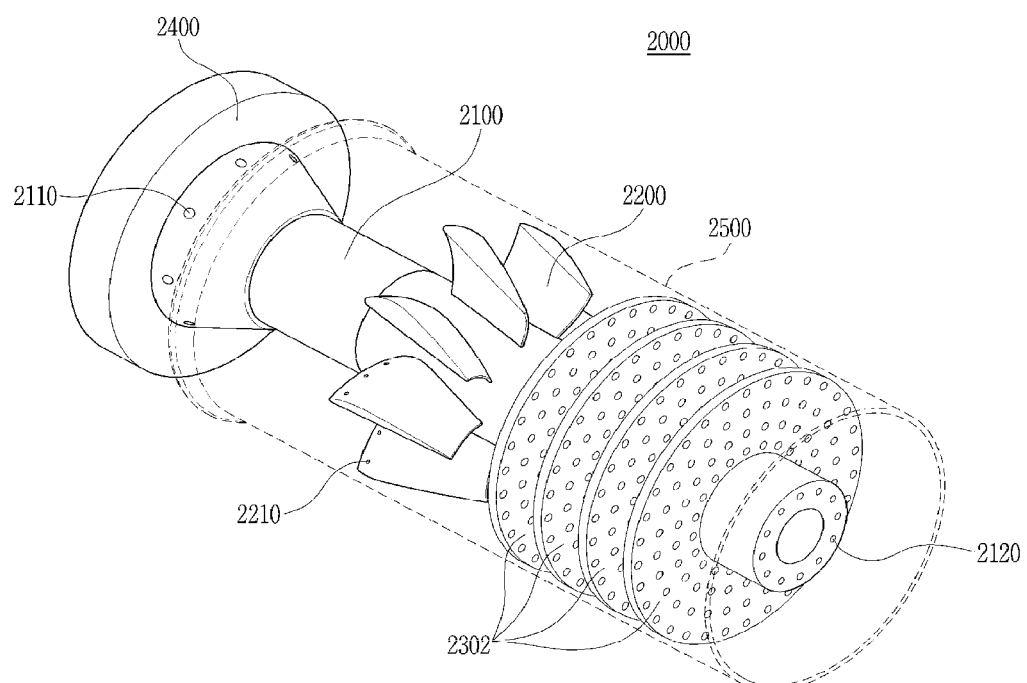
FIG. 11 is a partially transparent, perspective view of a fuel nozzle according to another embodiment of the present disclosure.
Figure 12:
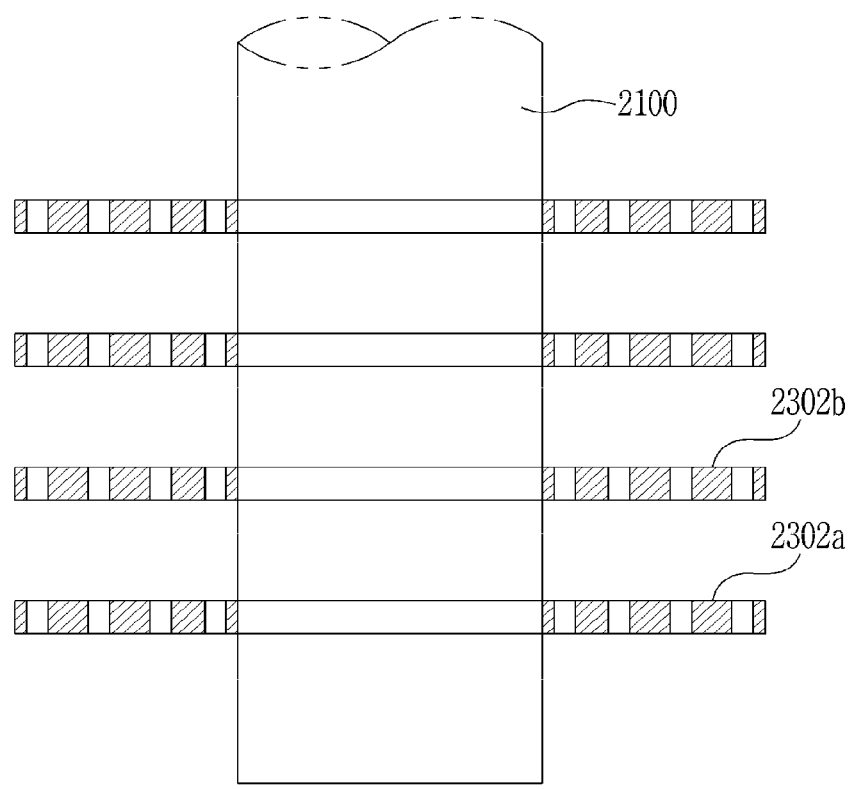
FIGS. 12 and 13 are cross-sectional side views illustrating modified examples of the porous disk shown in FIG. 11.
Figure 13:
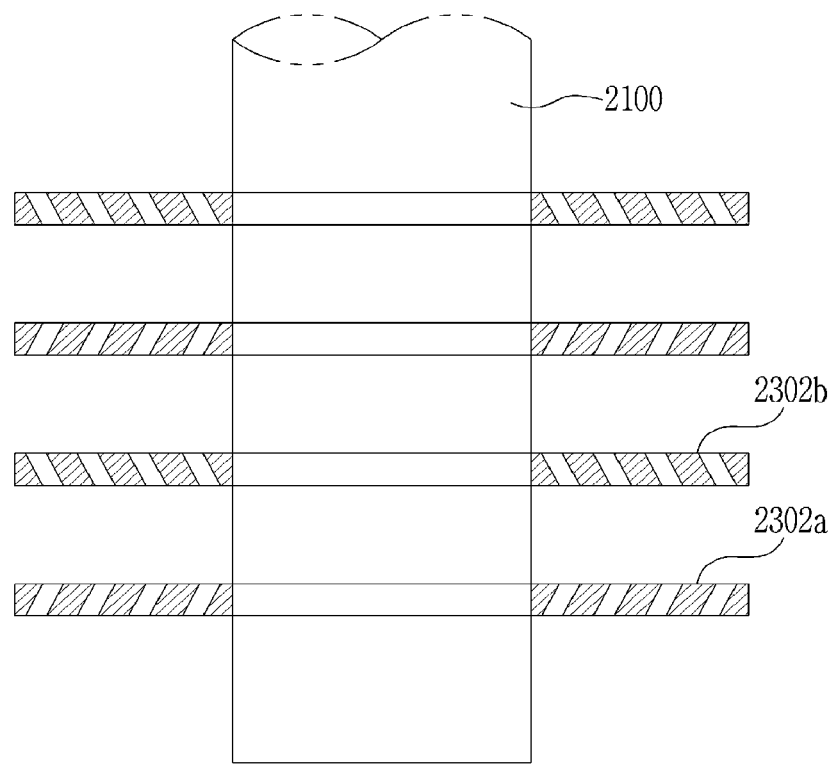

Next, a fuel nozzle 2000 according to another embodiment of the present disclosure will be described with reference to FIGS. 11 to 13, in which each of the fuel nozzles of the fuel nozzle module (FIG. 3) includes an injection cylinder 2100, swirlers 2200, a nozzle flange 2400, a shroud 2500. In the embodiment of FIGS. 11 to 13, the structure and function of the injection cylinder 2100, swirlers 2200, nozzle flange 2400, and shroud 2500 are consistent with those of the above-described embodiment, their detailed description will be omitted.

As illustrated in FIG. 11, the fuel nozzle 2000 according to another embodiment of the present disclosure includes a plurality of porous disks 2302 disposed in the space between the shroud 2500 and the injection cylinder 2100 and spaced apart by a predetermined distance or interval. These porous disks 2302 include at least one of the porous disks 2300 modified according to the above-described embodiment, namely, a porous disk according to one of FIGS. 6 to 10. In the present embodiment, at least two porous disks 2302 may be formed from the outer peripheral surface of the injection cylinder 2100 to the inner peripheral surface of the shroud 2500.

As illustrated in FIG. 12, a plurality of porous disks 2302 are formed and each have flow holes 2320. In this case, the arrangement of the porous disks 2302 from one disk to the next is repetitive. When the porous disks 2302 are arranged such that each of the flow holes 2320 is aligned with the flow direction of fuel, it is possible to render a smooth flow of air by imparting a repeated linearity to the fuel introduced into the space between the shroud 2500 and the injection cylinder 2100.

As illustrated in FIG. 13, a plurality of porous disks 2302 are formed and each have flow holes 2320. In this case, the arrangement of the porous disks 2302 from one disk to the next is alternated. When the porous disks 2302 are arranged such that each of the flow holes 2320 is alternately inclined to form a series of predetermined opposing angles with the flow direction of fuel, it is possible to more smoothly mix fuel by imparting a repeated swirling effect to the fuel introduced into the space between the shroud 2500 and the injection cylinder 2100.

The fuel nozzles 2000 of FIGS. 11 to 13 each includes the plurality of porous disks 2302. Therefore, even when a porous disk 2302a facing the combustion chamber 1240 is damaged due to a flashback phenomenon, the flashback phenomenon can be prevented by a next porous disk 2302h.

Figure 14:
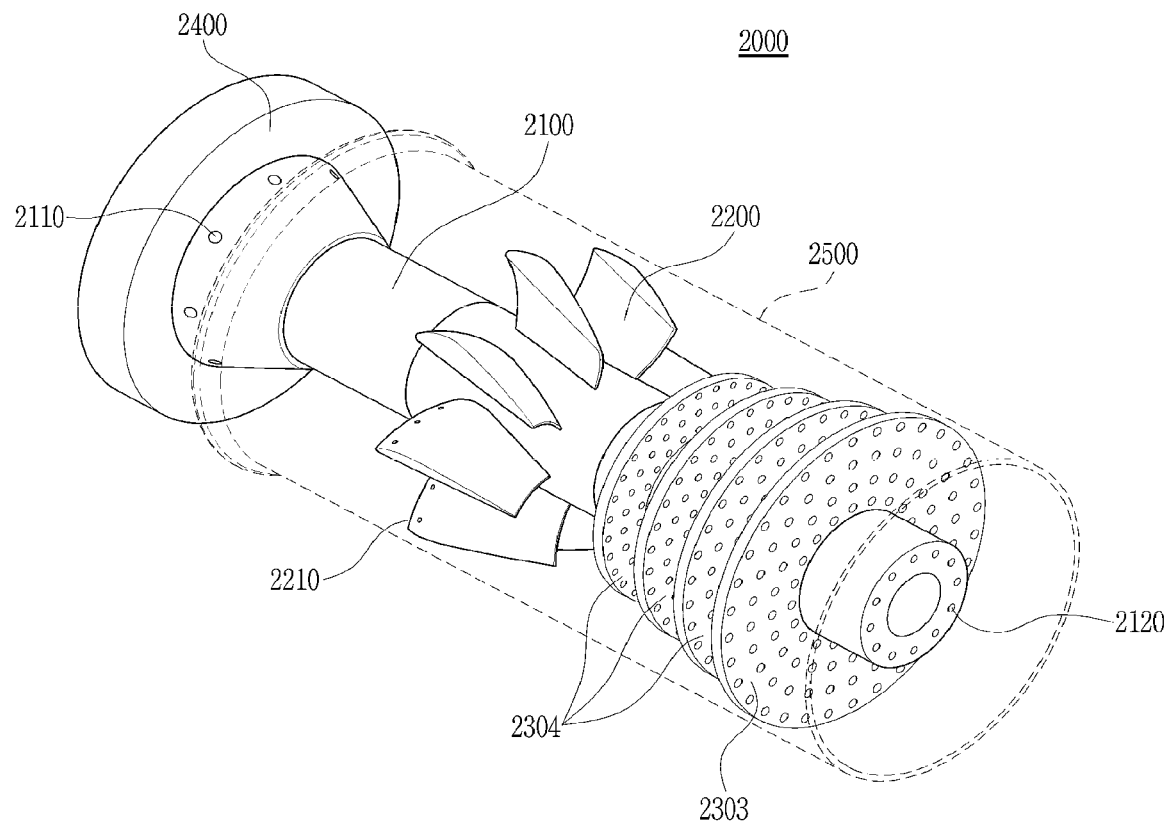
FIG. 14 is a partially transparent, perspective view of a fuel nozzle according to a further embodiment of the present disclosure.

Next, a fuel nozzle 2000 according to a further embodiment of the present disclosure will be described with reference to FIG. 14, in which each of the fuel nozzles of the fuel nozzle module (FIG. 3) includes an injection cylinder 2100, swirlers 2200, a nozzle flange 2400, a shroud 2500. In the embodiment of FIG. 14 the structure and function of the injection cylinder 2100, swirlers 2200, nozzle flange 2400, and shroud 2500 are consistent with those of the above-described embodiment, their detailed description will be omitted.

As illustrated in FIG. 14, the fuel nozzle 2000 according to the further embodiment of the present disclosure includes a plurality of porous disks 2303 and 2304 respectively provided in successive stages along the longitudinal length of the injection cylinder 2100. These porous disks 2303 and 2304 include at least one of the porous disks 2300 modified according to the above-described embodiment, namely, a porous disk according to one of FIGS. 6 to 11. In the present embodiment, a first porous disk 2303 facing the combustion chamber 1240 extends from the outer peripheral surface of the injection cylinder 2100 to the inner peripheral surface of the shroud 2500, and second porous disks 2304 disposed behind the first porous disk 2303 are each spaced at a predetermined distance from the inner peripheral surface of the shroud 2500. In general, the second porous disks 2304 have respective diameters that incrementally increase toward the combustion chamber 1240. Moreover, since the first porous disk 2303 may have the largest diameter, the incremental increase in diameters toward the combustion chamber 1240 is effected for all of the first and second porous disks 2303 and 2304.

Since the first and second porous disks 2303 and 2304 have diameters that gradually increase toward the combustion chamber 1240, it is possible to render a smooth flow of air by securing a flow passage for the fuel introduced into the space between the shroud 2500 and the injection cylinder 2100. Therefore, even when the first porous disk 2303 facing the combustion chamber 1240 is damaged due to a flashback phenomenon, it is possible to prevent the flashback phenomenon using one or more the subsequent (second) porous disks 2304. That is, flashback may be partially prevented by the first porous disk 2303 assuming its function is not effectively destroyed, in which case the second porous disks 2304 can prevent the flashback that may traverse a damaged portion of the first porous disk 2303 from reaching the fuel nozzle. In this case, one or more of the second porous disks 2304 may not fully span the distance between the shroud 2500 and the injection cylinder 2100.

As is apparent from the above description, in accordance with the exemplary embodiments of the present disclosure, it is possible to prevent a flashback phenomenon occurring due to a reduction in pressure around the swirler by installing a porous disk downstream of the swirler. In addition, by forming variously configured flow holes in the porous disk, it is possible to impart linearity or a swirling effect to the flow of fuel passing through the fuel nozzle.

While the present disclosure has been described with respect to the specific embodiments, it will be apparent to those skilled in the art that various changes and modifications may be made without departing from the spirit and scope of the disclosure as defined in the following claims.

The invention claimed is:

1. A fuel nozzle comprising:
a shroud;
an injection cylinder surrounded by the shroud and configured to supply fuel to a combustion chamber;
a swirler disposed between the injection cylinder and the shroud; and
a plurality of porous disks disposed on the injection cylinder downstream of the swirler to suppress a flashback phenomenon occurring due to a reduction in pressure around the swirler, the flashback being a phenomenon in which a flame produced in the combustion chamber flows back to the fuel nozzle,
wherein the plurality of porous disks include a first porous disk facing, in a downstream direction, the combustion chamber with a space disposed between the first porous disk and an downstream end of the shroud and defined between the shroud and the injection cylinder, the space being open toward the combustion chamber such that the first porous disk meets the flashback phenomenon from the combustion chamber, and a second porous disk facing, in an upstream direction, the swirler, and each of the first and second porous disks extends from the outer circumferential surface of the injection cylinder towards an inner circumferential surface of the shroud
wherein at least one of the first porous disk and the second porous disk is spaced a distance from the inner circumferential surface of the shroud according to an amount of the reduction in pressure around the swirler,
wherein the first porous disk is in fluid communication with the downstream end of the shroud without intervening structure in the space.

2. The fuel nozzle according to claim 1, wherein the swirler is disposed in a middle of the injection cylinder.

3. The fuel nozzle according to claim 2, wherein each of the plurality of porous disks includes a disk body adapted to block the flame produced in the combustion chamber and a plurality of flow holes formed in the disk body through which the fuel flows.

4. The fuel nozzle according to claim 3, wherein each flow hole has a straight through-hole shape aligned with a flow direction of the fuel.

5. The fuel nozzle according to claim 4, wherein the plurality of porous disks are arranged such that a flow direction of each of the flow holes of one of the plurality of porous disks aligns with a flow direction of each of the flow holes of other porous disks of the plurality of porous disks.

6. The fuel nozzle according to claim 3, wherein each flow hole has a diagonal through-hole shape being at an angle with the flow direction of the fuel.

7. The fuel nozzle according to claim 6, wherein the plurality of porous disks are arranged such that a flow direction of each of the flow holes of one of the plurality of porous disks is inclined in a first direction, and a flow direction of each of the flow holes of an adjacent porous disk of the plurality of porous disks is inclined in a second direction opposing the first direction.

8. The fuel nozzle according to claim 3, wherein the plurality of flow holes have different diameters.

9. The fuel nozzle according to claim 8, wherein the different diameters of the plurality of flow holes increase from an inner peripheral surface of the disk body toward an outer peripheral surface of the disk body.

10. The fuel nozzle according to claim 3, wherein each disk body of each porous disk has an outer peripheral surface that is spaced apart from the inner circumferential surface of the shroud by a respective predetermined distance.

11. The fuel nozzle according to claim 10, wherein the respective predetermined distance is determined according to the amount of the pressure reduction around the swirler.

12. The fuel nozzle according to claim 1, wherein the first porous disk extends from the outer circumferential surface of the injection cylinder to the inner circumferential surface of the shroud.

13. The fuel nozzle according to claim 12, wherein the first porous disk and the second porous disk have different diameters.

14. The fuel nozzle according to claim 12, wherein the plurality of porous disks have respective diameters that incrementally increase toward the combustion chamber.

15. A combustor comprising:
a combustion chamber assembly comprising a combustion chamber in which fuel is combusted; and
a fuel nozzle assembly comprising a plurality of fuel nozzles to inject the fuel into the combustion chamber, each of the fuel nozzles comprising:
a shroud;
an injection cylinder surrounded by the shroud and configured to supply fuel to the combustion chamber;
a swirler disposed between the injection cylinder and the shroud; and
a plurality of porous disks disposed on the injection cylinder downstream of the swirler to suppress a flashback phenomenon occurring due to a reduction in pressure around the swirler, the flashback being a phenomenon in which a flame produced in the combustion chamber flows back to the fuel nozzle,
wherein the plurality of porous disks include a first porous disk facing, in a downstream direction, the combustion chamber with a space disposed between the first porous disk and an downstream end of the shroud and defined between the shroud and the injection cylinder, the space being open toward the combustion chamber such that the first porous disk meets the flashback phenomenon from the combustion chamber, and a second porous disk facing, in an upstream direction, the swirler, and each of the first and second porous disks extends from the outer circumferential surface of the injection cylinder towards an inner circumferential surface of the shroud,
wherein at least one of the first porous disk and the second porous disk is spaced a distance from the inner circumferential surface of the shroud according to an amount of the reduction in pressure around the swirler,
wherein the first porous disk is in fluid communication with the downstream end of the shroud without intervening structure in the space.

16. The combustor according to claim 15,
wherein each of the plurality of porous disks includes a disk body adapted to block the flame produced in the combustion chamber and a plurality of flow holes formed in the disk body through which the fuel flows.

17. The combustor according to claim 16,
wherein each flow hole has a straight through-hole shape aligned with a flow direction of the fuel, and
wherein the plurality of porous disks are arranged such that a flow direction of each of the flow holes of one of the plurality of porous disks aligns with a flow direction of each of the flow holes of other porous disks of the plurality of porous disks.

18. The combustor according to claim 16,
wherein each flow hole has a diagonal through-hole shape being at an angle with the flow direction of the fuel, and
wherein the plurality of porous disks are arranged such that a flow direction of each of the flow holes of one of the plurality of porous disks is inclined in a first direction, and a flow direction of each of the flow holes of an adjacent porous disk of the plurality of porous disks is inclined in a second direction opposing the first direction.

19. The fuel nozzle according to claim 16, wherein the plurality of porous disks have respective diameters that incrementally increase toward the combustion chamber.

20. A gas turbine comprising:
a compressor to compress air;
a combustor to produce combustion gas by mixing the compressed air with fuel for combustion; and
a turbine to generate power using the combustion gas,
wherein the combustor comprises:
a combustion chamber assembly comprising a combustion chamber in which fuel is combusted; and
a fuel nozzle assembly comprising a plurality of fuel nozzles to inject the fuel into the combustion chamber, each of the fuel nozzles comprising:
an injection cylinder covered by a shroud and configured to supply fuel to the combustion chamber;
a swirler on the injection cylinder and extending towards the shroud; and
a plurality of porous disks disposed on the injection cylinder downstream of the swirler to suppress a flashback phenomenon occurring due to a reduction in pressure around the swirler, the flashback being a phenomenon in which a flame produced in the combustion chamber flows back to the fuel nozzle,
wherein the plurality of porous disks include a first porous disk facing, in a downstream direction, the combustion chamber with a space disposed between the first porous disk and an downstream end of the shroud and defined between the shroud and the injection cylinder, the space being open toward the combustion chamber such that the first porous disk meets the flashback phenomenon from the combustion chamber, and a second porous disk facing, in an upstream direction, the swirler, and each of the first and second porous disks extends from the outer circumferential surface of the injection cylinder towards an inner circumferential surface of the shroud,
wherein at least one of the first porous disk and the second porous disk is spaced a distance from the inner circumferential surface of the shroud according to an amount of the reduction in pressure around the swirler,
wherein the first porous disk is in fluid communication with the downstream end of the shroud without intervening structure in the space.

* * * * *